(12) United States Patent
Francis et al.

(10) Patent No.: US 6,584,532 B1
(45) Date of Patent: Jun. 24, 2003

(54) BRANCH SEARCHING TO PRIORITIZE RECEIVED INTERRUPT SIGNALS

(75) Inventors: Hedley James Francis, Weston Colville (GB); Dominic Hugo Symes, Cherry Hinton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/572,729

(22) Filed: May 17, 2000

(51) Int. Cl.[7] .............................................. G06F 13/26
(52) U.S. Cl. ...................................... 710/264; 710/244
(58) Field of Search ................................ 710/260–269, 710/46–50, 36–45, 107–125, 240–244; 707/1–7

(56) References Cited

U.S. PATENT DOCUMENTS

| | | | | |
|---|---|---|---|---|
| 5,603,035 A | * | 2/1997 | Erramoun et al. | 710/260 |
| 5,784,383 A | * | 7/1998 | Meaney | 714/732 |
| 5,918,057 A | * | 6/1999 | Chou et al. | 709/102 |
| 6,233,572 B1 | * | 5/2001 | Crawford et al. | 707/2 |
| 6,356,970 B1 | * | 3/2002 | Killian et al. | 710/260 |

* cited by examiner

Primary Examiner—Sumati Lefkowitz
(74) Attorney, Agent, or Firm—Nixon & Vanderhye P.C.

(57) ABSTRACT

A data processing system 2 for identifying the highest priority source signal from a plurality of signals each controlling the setting of a bit of a status word held within a status register 10 using programmable mask words. The mask words are used in a branch search strategy to successively narrow the possibilities for the highest priority bit at each search level until a single bit within the status word is identified corresponding to the highest priority interrupt signal. The programmable masks may be programmed for a particular configuration of the priorities of the respective bits within the status word. The branch search strategy provides a reduced maximum interrupt latency and improved predictability in the interrupt latency.

14 Claims, 6 Drawing Sheets

US 6,584,532 B1

BRANCH SEARCHING TO PRIORITIZE RECEIVED INTERRUPT SIGNALS

BACKGROUND OF THE INVENTION

1. Field of the Invention

This invention relates to data processing systems. More particularly, this invention relates to data processing systems which receive a plurality of signals from a plurality of different signal sources that must be prioritised.

2. Description of the Prior Art

An example of a data processing system receiving a plurality of signals that must be prioritised is the receipt of interrupt signals by a data processing system. Interrupt signals commonly result in the data processing system suspending execution of a current program and diverting to execute an interrupt routine to handle the received interrupt signal. It is possible, and in many cases probable, that more than one interrupt signal will be received at any given time. In this case, the highest priority interrupt that should be dealt with first must be identified from among the received interrupts.

An important performance parameter in many data processing systems is the interrupt latency. This can be thought of as the maximum time taken by the data processing system to respond to the given interrupt signal. In many data processing applications, it is important that the interrupt latency should be low. A further important factor is that the interrupt latency should be predictable. As an example, if the data processing system is part of a safety system operating in real time, such as a vehicle airbag system, then it is not sufficient that the data processing system should respond in good time to an interrupt to trigger deployment 99 times out of 100, rather the data processing system must provide an acceptable maximum interrupt latency in all circumstances.

The above requirements for a low and predictable interrupt latency are further complicated by a desire to be able to reorder the priority of the interrupt signals. If the priority of an interrupt signal is determined solely by the hardwired configuration of the data processing system, then this hardware configuration needs to be changed in order to change the interrupt priority, i.e. this arrangement may preclude the ability to dynamically change the interrupt priorities during different operational modes of a signal piece of hardware. Even when such dynamic alternation of the interrupt hardware is not required, a need to modify the hardware for different implementations to reflect their different interrupt priorities is a disadvantageous overhead in terms of design time and testing.

SUMMARY OF THE INVENTION

One aspect the present invention provides apparatus for processing data, said apparatus comprising:

(i) an signal receiving circuit coupled to a plurality of signal sources, said signal receiving circuit providing a signal status word, one or more bits of said signal status word indicating whether a respective signal source has asserted a signal; and (ii) signal prioritising logic for reading said signal status word and identifying, using a branch search having a plurality of search levels, in accordance with a predetermined priority ordering, a highest priority signal source indicated by said signal status word as having asserted a signal; wherein (iii) said signal prioritising logic searches said signal status word using one or more programmable mask words that are combined with said signal status word to generate a result indicative of said highest priority signal source; and (iv) changing said one or more programmable mask words changes said predetermined priority ordering.

The invention recognises the above combination of problems and provides the solution of using programmable masks to search through a signal status word containing bits indicating whether respective signals have been asserted in order to identify the highest priority signal. Such a technique using programmable masks as part of a branch search has been found to provide a reduced maximum interrupt latency and to allow software programming of the mask words to change the priorities. The invention recognises that whilst such a programmable mask technique has the disadvantage over other software techniques of increasing the minimum response time for some signal sources, this is more than outweighed by the reduction in the maximum overall response time that is produced and the increased predictability of the response time.

In some embodiments of the invention a plurality of programmable masks may be associated with each search level and the mask used at each search level selected in dependence upon search results from one or more preceding search levels. This approach has the advantage that it is possible to arrange that when the bottom of the branch search has been reached, then the signal source will be directly identifiable from the results of the last comparison with a mask without requiring significant further processing or lookups.

An alternative approach used in different embodiments of the invention is one in which the programmable mask used at each search level is independent of the previous search results with the signal status word being modified at each search level in dependence upon the search results from the preceding search level. This approach reduces the number of masks required, which may mean that they can all be held in data processing registers, but has the disadvantage of requiring further processing after the last search level has been reached in order to identify the signal source.

Whilst it is appreciated that the invention may be used to prioritise signals from many different signal sources, it is particularly useful in circumstances where the signal sources are a plurality of interrupt signals.

In this case the signal prioritising circuit contributes to the interrupt latency time and reducing this in the context of an integrated circuit is particularly advantageous.

Whilst it will be appreciated that the signal prioritising logic could be embodied as hardware using programmable mask words, it is preferred that the signal prioritising logic comprises a data processor operating under program instruction control. In this way, a software routine can be made to identify the highest priority source in a highly flexible manner and using resources that are already present within the circuit.

A preferred way of increasing the performance of the signal prioritising logic subroutine is to store the programmable mask words in data processing registers prior to conducting ,the search as it is known that these programmable mask words will be needed and high speed access can be gained to them from the registers.

Viewed from another aspect the invention provides a method of processing data, said method comprising the steps of:

(i) generating a signal status word, one or more bits of said signal status word indicating whether a respective signal source has asserted a signal; and (ii) reading said signal status word and identifying, using a branch search having a plurality of search levels, in accordance with a predetermined priority ordering, a highest priority signal source indicated by said signal status word as having asserted a signal; and (iii) searching said signal status word using one or more programmable mask words that are combined with said signal status word to generate a result indicative of said highest priority signal source; wherein (iv) changing said one or more programmable mask words changes said predetermined priority ordering.

The invention may also be provided in the form of a computer program held on a computer program product for controlling a general purpose processor to perform the techniques described above.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
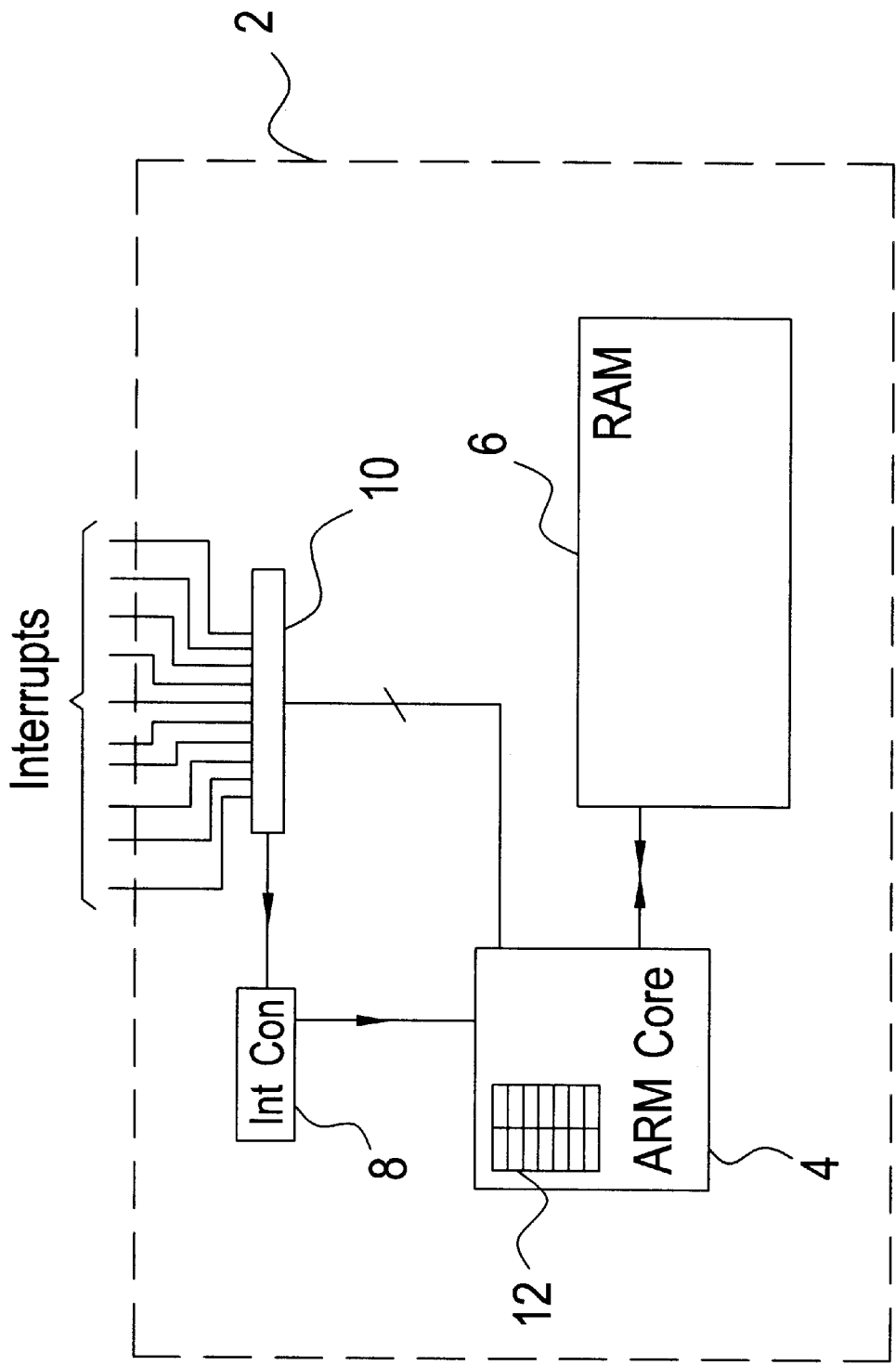
FIG. 1 illustrates a data processing system.

FIG. 1 illustrates a data processing system in the form of an integrated circuit 2 including a processor core 4, a random access memory 6, an interrupt controller 8 and a status word register 10. It will be appreciated that the integrated circuit 2 will contain many more circuit elements, but these have been omitted from the illustration for the sake of simplicity.

The status word register 10 has respective bits connected to respective interrupt signal sources from outside of the integrated circuit 2. If one of these interrupt signal sources in asserted, then this causes the respective bit $B_n$ within the status word register 10 to change from a "0" to a "1". The interrupt controller 8 detects the occurrence of any change within the contents of the status word registered 10 and signals this to the processor core 4. This triggers the processor core 4 to start executing an interrupt handling routine in the form of software held within the random access memory 6. A task of this interrupt handling software is to identify the highest priority interrupt source that has been asserted as indicated by the status word stored in the status word registered 10. It will be appreciated that in many cases more than one interrupt signal may be asserted in the status word and the interrupt handling software has to determine which of the interrupt sources should be responded to first.

The processor core 4 reads the status word from the status word register 10 and stores this within a register of the processor core register bank 12. One or more programmable mask words may also be loaded into the register bank 12 from the random access memory 6 prior to execution of the portion of the interrupt handling software that will identify the highest priority interrupt.

Figure 2:
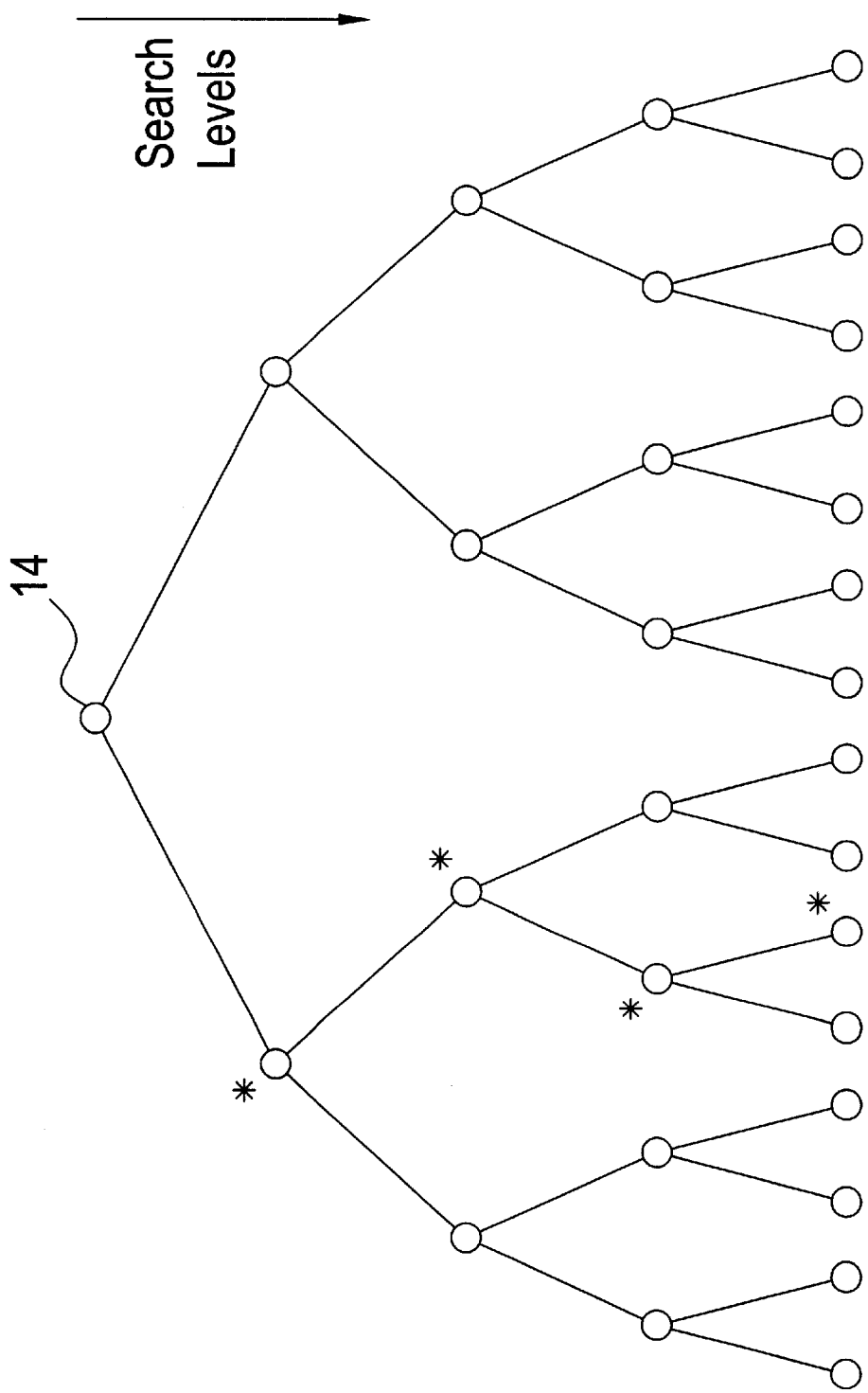
FIG. 2 illustrates a branch search.

FIG. 2 schematically illustrates a branch search. The illustrated example has four search levels. The unprocessed status word is read in at level 14. At each search level a test is made as to whether the highest priority interrupt present is located within a first set of interrupts or a second set of interrupts. In this way, the software narrows down the range of possibilities for the interrupt that may be the highest priority interrupt asserted. At each subsequent level, the remaining possibilities for the interrupt that may represent the highest priority interrupt are further subdivided into new sets and a test made to determine which of these new sets contains the highest priority interrupt. By the time the lowest level is reached, there is only a single possibility for the highest priority interrupt that has been asserted and accordingly this is uniquely identified. The time taken to traverse the search levels is relatively constant irrespective of which interrupt has been asserted and this helps to produce a consistent interrupt latency within the system. Furthermore, the time taken to identify a particular interrupt as the highest priority interrupt is substantially independent of which interrupt has be en asserted and is low enough to produce an improvement in the maximum interrupt latency of the system as a whole.

Figures 3, 4:
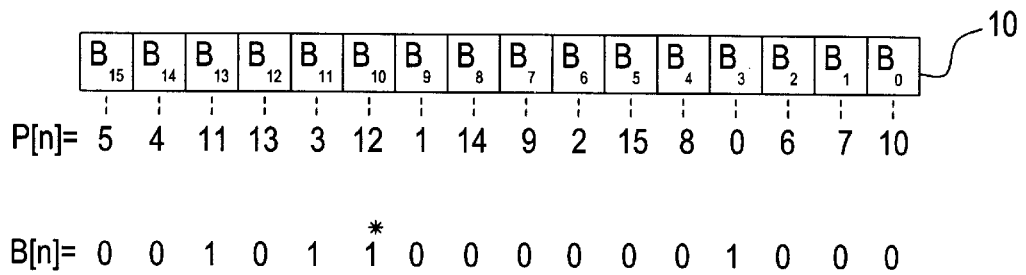
FIG. 3 illustrates an example prioritisation amongst status bits within a status word and an example status word.
FIG. 4 illustrates a first set of programmable masks words for performing a branch search.

It will be appreciated that it might be possible to write software that identified a particularly high priority interrupt very rapidly, but that this would be at the disadvantage of significantly slowing down the speed at which a lower priority interrupt could be identified. In such a situation, the overall maximum interrupt latency of the system would be controlled by the lowest priority interrupt and this would be a less advantageous. In addition a longer more complex piece of software would be likely to extend the period for which interrupts are disabled FIG. 3 illustrates how the bits within the status register 10 may be allocated different priorities. The status register 10 as illustrative in FIG. 3 contains a 16-bit status word $B_{15}$ to $B_0$. (FIG. 3 shows the status register 10 as containing more bits than illustrated in FIG. 1, the number of signal lines in FIG. 1 having been reduced to simplify the diagram.) The priorities associated with respective bits $B_n$ within the status word register 10 are indicated by the numbers shown beneath the respective bits and as defined by a function P[n]. The lowest priority interrupt has a priority level of "0" and the highest priority interrupt has a priority level of "15".

B[n] illustrates a typical 16-bit status word that may be generated during data processing. In this example there are four non-zero bits within the status word indicating that four interrupt signals are being simultaneously asserted. Comparing the priority levels of these respective bits within the status word indicates that the highest priority interrupt is that associated with bit $B_{10}$ and this has a priority level of "12". The interrupt software should identify this $B_{10}$ as representing the highest priority interrupt asserted using the programmable mask words.

FIG. 4 schematically illustrates a first embodiment using a series of programmable mask words to identify bit $B_{10}$ from FIG. 3. Mask0 is at the top level in the branch search. This mask has been programmed to have non-zero bits at the bit positions corresponding to the eight highest priority positions within the status word. Accordingly, when this mask is ANDed with the status word, then a non-zero result will be produced if any of the eight highest priority interrupts have been asserted as indicated by their respective bits within the status word. As illustrated in FIG. 4, at the top level in the search, the programmable Mask0 has a "1" at bit position $B_{10}$ corresponding to the highest priority interrupt that has been asserted and accordingly a non-zero NZ result will be returned from the comparison. This non-zero result indicates that the highest priority interrupt asserted is one within the set comprising the eight highest priority interrupts, i.e. the set $B_{13}$, $B_{12}$, $B_{10}$, $B_8$, $B_7$, $B_5$, $B_4$, $B_0$. The non-zero result serves to select which programmable mask is applied at the next search level. In this case, the next mask applied is $Mask1_h$. This is the second level mask selected when the highest priority bit asserted is within the highest range as detected in the preceding search level. The $Mask1_h$ has non-zero bits at bit positions $B_{12}$, $B_{10}$, $B_8$ and $B_5$. Again, the highest priority bit asserted corresponds to the bit position $B_{10}$ and accordingly a non-zero result is returned from this comparison. It will be seen that if the first search level had produced a zero result, then the programmable $Mask1_l$ would have been selected instead to test the lower half of the interrupt priorities identified.

It will be appreciated that the various masks may be programmed with different bit patterns to reflect the priorities levels associated with the respective interrupt signals within the status word. Masks can be reprogrammed dynamically to depend upon the operating mode of the integrated circuit. Alternatively, they may be programmed for a particular application of the integrated circuit where the integrated circuit is a common piece of hardware used in several different applications requiring different interrupt priorities.

It will be seen that the non-zero result returned from the second level test within the branch search results in $Mask2_{hh}$ being selected for the third search level. This mask results in a zero result being returned from the comparison with the status word. Accordingly, the fourth level $Mask3_{hhl}$ is selected as the final mask to determine whether the highest priority bit asserted is $B_{12}$ corresponding to priority level 13 or $B_{10}$ corresponding to priority level 2. The zero result returned from this final comparison unambiguously identifies $B_{10}$ as the highest priority bit asserted.

It will be appreciated that the processor core 4 used may be an ARM processor core that includes a fully conditional instruction set making the selection of masks dependent upon a zero or non-zero results from a preceding instruction particularly efficient to implement.

The eight lowest level masks $Mask3_{xxx}$ each have two interrupts associated with them. The first interrupt is identified as the highest priority interrupt asserted if a non-zero result is returned and the second interrupt is identified as the highest priority interrupt asserted if a zero result is returned. These associations with the lowest level masks may be made at the same time that the masks are programmed.

Figure 5:
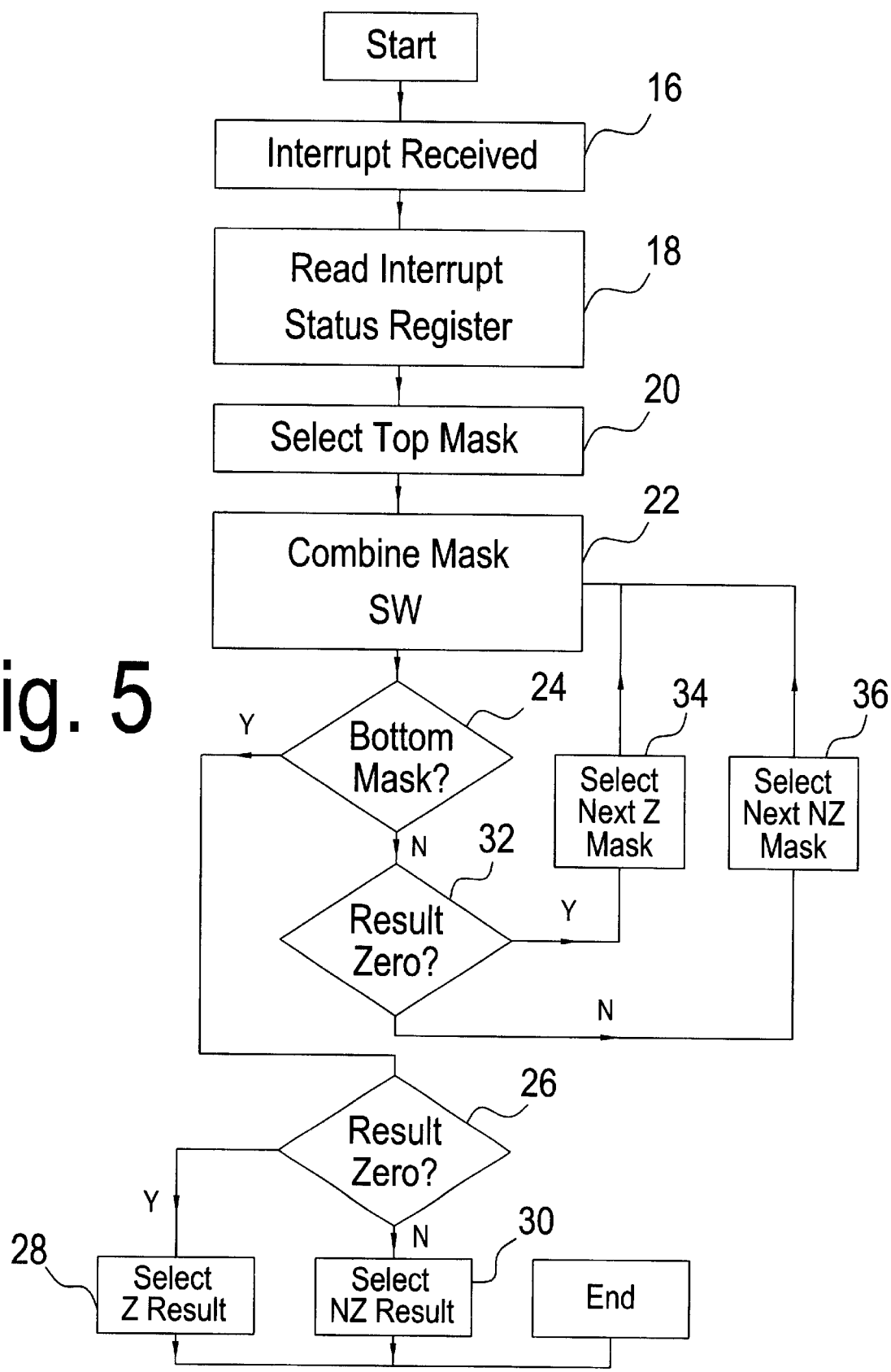
FIG. 5 is a flow diagram illustrating the search technique of FIG. 4.

FIG. 5 is a flow diagram illustrating the operation of the embodiment of FIG. 4. At step 16, an interrupt signal is received by the integrated circuit 2 and identified by the interrupt controller 8. At step 18, the contents of the status word within the status word register are read by the processor core 4 and the interrupt handler software started. At step 20, the top search level mask is selected for application to the status word. At step 22, the currently selected mask and the status word are combined with a logical AND. Step 24 serves to identify whether this is the bottom search level mask that is being applied. If the bottom level mask is being applied, then processing proceeds to step 26 where a zero result from the step 22 operation results in selection of the interrupt indicated by a zero result at step 28 whilst a non-zero result at step 22 selects the interrupt indicated by such a non-zero result at step 30. If step 24 identifies that the bottom level mask is not being applied, then step 32 serves to determine whether the result of the operation at step 22 is zero or non-zero and selects the appropriate mask to be used at the next search level via steps 34 or 36.

Figure 6:
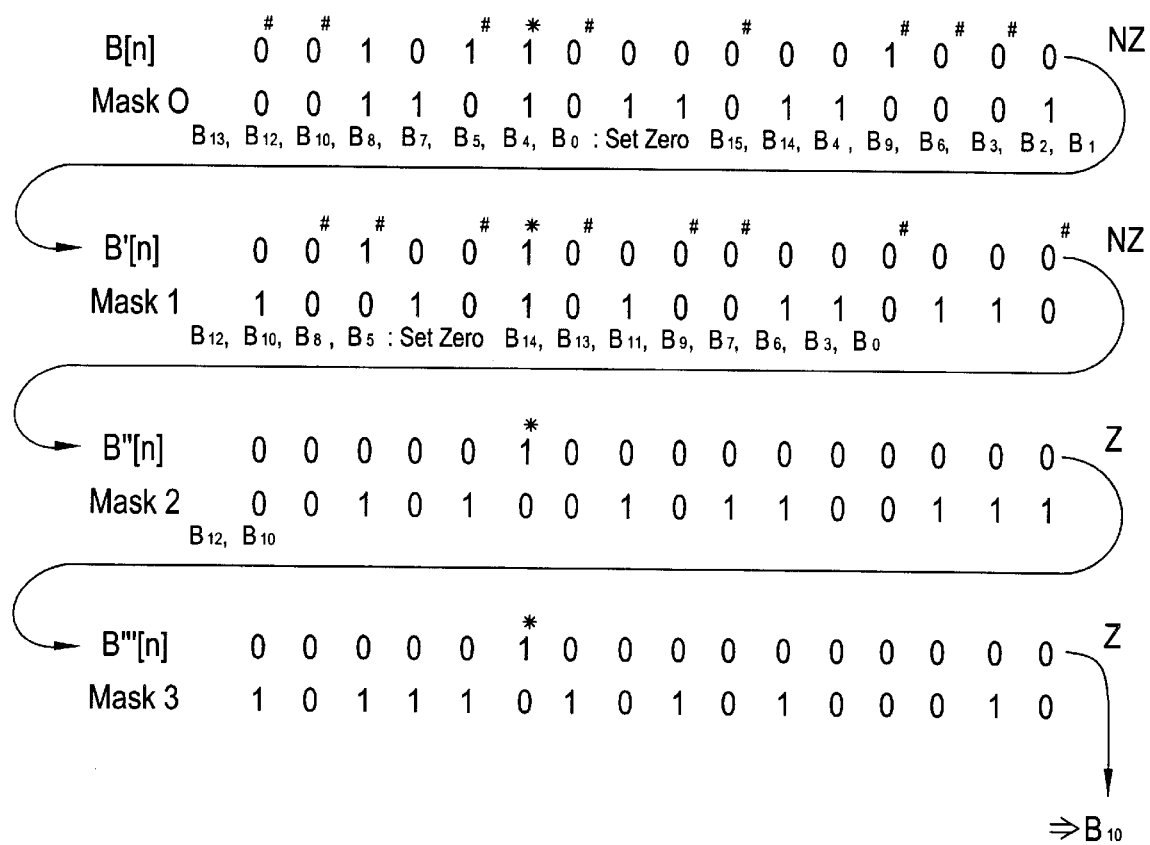
FIG. 6 illustrates a second set of programmable masks words for performing a branch search.

FIG. 6 schematically illustrates another embodiment of the invention. In this embodiment the same status word as illustrated in FIG. 3 is being analysed with its associated programmable priority levels. The mask applied at each search level is independent of the results of the comparison at the preceding search level. However, in moving between each search level, if the preceding comparison produced a non-zero result, then at least lone bit within the status word corresponding to a non-zero bit within the preceding mask is non-zero and is the highest priority interrupt. Accordingly, all bit positions corresponding to zero values within the preceding mask can be removed as potential candidates for the highest priority interrupt signal. Bits within the status word that are zeroed in this way are indicated by a "#".

At the top level, the eight non-zero bits with the mask simply correspond to the eight highest priority interrupt positions within the status word. At the next search level, the non-zero bits within the mask correspond to the top priority halves of the respective two sets selected between by the previous search level. Any bits within the status word that have been eliminated from consideration as potential candidates for the highest priority interrupt as a result of a non-zero result at the previous step will have been zeroed so that a non-zero bit for those bits within the mask will not lead to a false recognition of those bits as relevant to the determination of the highest priority interrupt now taking place. Each of the masks has eight non-zero bits and eight zero bits which together with the step of zeroing excluded candidates upon occurrence of a non-zero result serve to half the number of possible candidates for the highest priority interrupt at each search level. The final search level in this example produces a zero result and accordingly no bits within the status word are set to zero at this level (however only a single bit is non-zero due to the previous processing). The final value of the status word can be used as a lookup into a table to determine which of the interrupts is the highest priority interrupt that has been asserted.

It will be appreciated that the embodiment illustrated in FIG. 6 has far fewer programmable masks than the previous embodiment, but suffers from the disadvantage that a lookup table is required to identify the interrupt from the modified status word after all the masks and conditional modifications have been applied.

Figure 7:
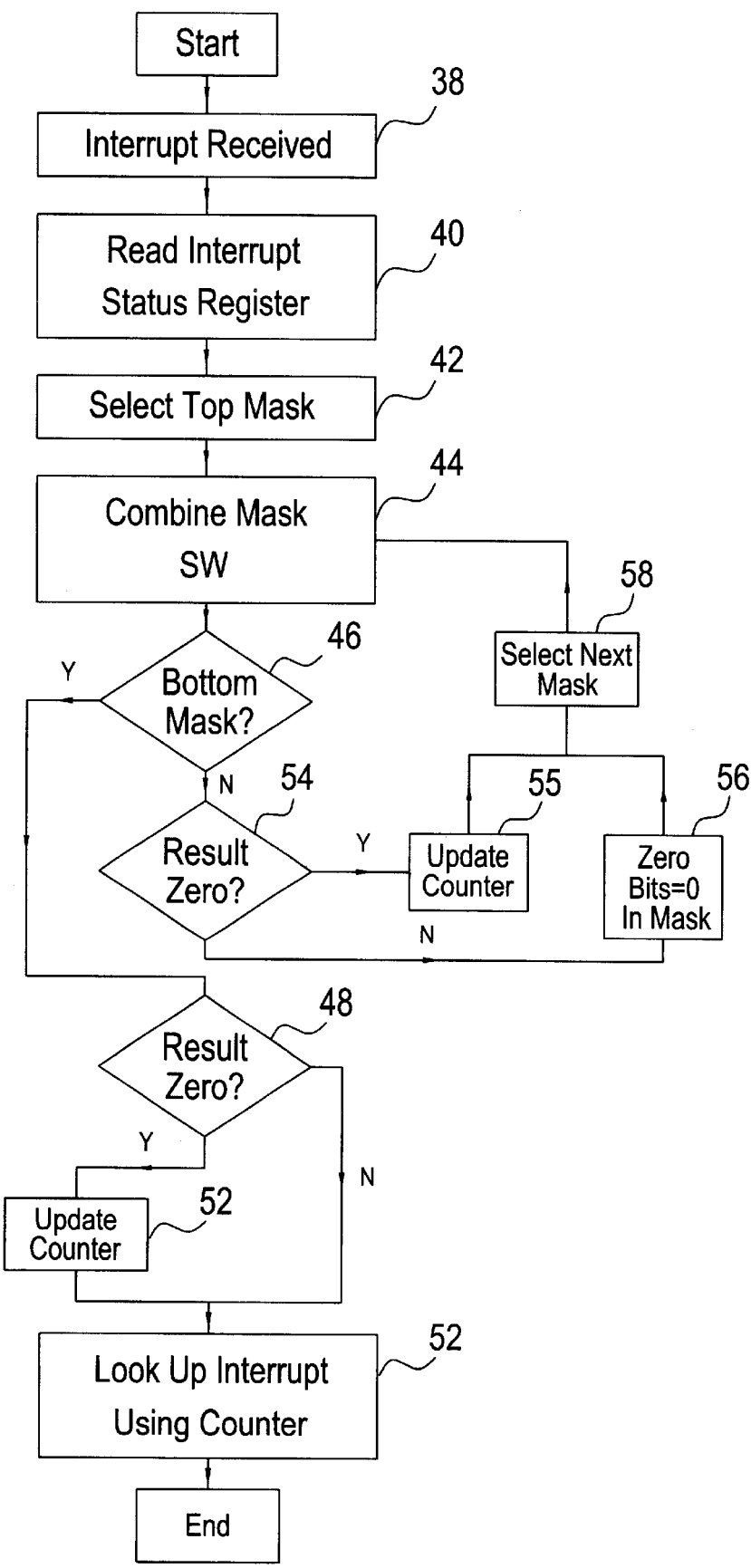
FIG. 7 is a flow diagram illustrating the search technique of FIG. 6.

FIG. 7 is a flow diagram illustrating the embodiment of FIG. 6. At step 38, an interrupt is received at the status register 10. This is detected by the interrupt controller 8 which triggers the processor core 4 to read the interrupt status register 10 at step 40 and initiate the interrupt handling routine. Step 42 selects the top level Mask0 and this is combined with the status word read from the status word register 10 at step 44 using a logical AND. Step 46 identifies whether the lowest search level mask is currently being applied. If this is the case, then processing proceeds to step 48 where a test is made for a zero result. The processing proceeds to step 50 on a non-zero result where a counter (stored in a register) is updated to yield a final pointer to the address of the interrupt of highest priority. If the result of the test at step 48 was that the result was non-zero, then processing proceeds directly to step 52 rather than to step 52 via step 50. At step 52, a lookup from the final counter value is made to a table to indicate the address of the highest priority interrupt that has been asserted.

If the results of the test at step 46 was that the bottom mask had not yet been reached, then processing proceeds to step 54 where the result of the operation at step 44 is tested to see if it is zero. If the result of step 54 is non-zero, then step 56 serves to zero those bits within a status word corresponding to "0" bits within the currently applied masks. If the result of step 54 is zero, then step 55 updates the counter that will ultimately serve as a pointer to the address of the highest priority interrupt. Step 58 serves to select the next mask down within the search levels before processing is returned to step 44.

Software executable on an ARM processor core to perform the interrupt identification in accordance with an embodiment similar to that of FIGS. 4 and 5 is explained below:

Assume that we have up to 32 interrupt sources, each source being assigned one bit in the interrupt status register, the bit being set if the interrupt input is active. The priority level for each interrupt may be set dynamically by a software call to an appropriate software library at any time. Given a register "status" containing the interrupt status results, the problem is to find the interrupt with highest priority which is active and call the corresponding service routine for that interrupt.

The technique uses a lookup table consisting of 64 32-bit entries (or in general N*2 entries for N interrupt sources). Entry [(2*k+1)<<m] should consist of:

(1) If m=0 then the entry should contain a[k], the address of the routine to handle the interrupt of priority k.

(2) If m>0 then the entry should contain a bitmask, with bits set for interrupts which have priority values p which are in the range:

$$((2*k+1)<<m)=<p<((2*k+2)<<m)$$

(where the lower priority interrupt has priority 0 and the highest priority interrupt priority 31).

This table encodes a binary tree of interrupt priorities.

To decode "status" the following ARM code algorithm should be used:

```
LDR ptr, = table_start + 32*4
; decide if one of the top 16 priority interrupts is active
LDR mask, [ptr], #16*4
TST status, mask
SUBEQ ptr, ptr #32*4
; now decide if it is in the top 8 of the 16 remaining
LDR mask, [ptr], #8*4
TST status, mask
SUBEQ ptr, ptr #16*4
; now decide if it is in the top 4 of the 8 remaining
LDR mask, [ptr], #4*4
TST status, mask
SUBEQ ptr, ptr #8*4
; now decide if it is in the top 2 of the 4 remaining
LDR mask, [ptr], #2*4
TST status, mask
SUBEQ ptr, ptr, #4*4
; now decide if it is in the top 1 of the 2 remaining
LDR mask, [ptr], #1*4
TST status, mask
SUBEQ ptr, ptr, #2*4
;jump to the interrupt handler
LDR pc, [ptr]
```

The first step of the algorithms decides if one of the sixteen highest priority interrupts is active in the status register. If so, then it move to one point in the table, if not then to another. Thus the technique has now narrowed the search down to the top 16 priority interrupts (if one was active) or the lower 16 (if not). The next step then repeats this process, but looking at the highest 8 priority interrupts of the 16 remaining in the search, and so on.

For example, suppose there were only 4 interrupt sources (instead of 32) indicated by bit 0, 4, 8, 12, of the status register. Suppose the priorities of these interrupts were 1, 3, 2, 0 respectively, (with 0=lowest priority, 3=highest priority). Then the tree of interrupt masks would be:

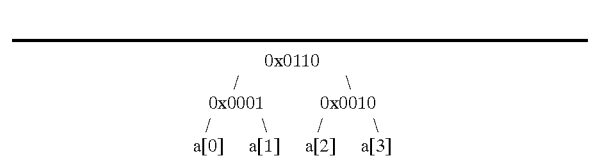

Where a [k] is the address of the dispatch routine for the interrupt with priority k. The format of the table in memory is then:

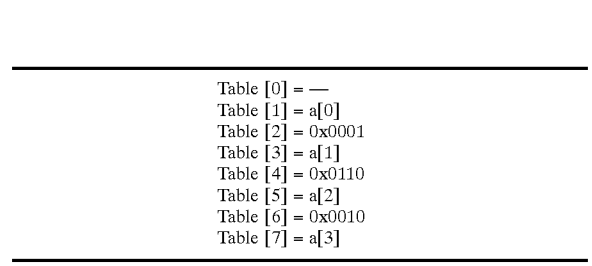

Software executable on an ARM processor for implementing an embodiment similar to that of FIGS. 6 and 7 is explained below:

Here we have a number of items, n=0 . . . N, (in this example they are interrupt sources) where the status of each item is either active or inactive, and where the items have a dynamically (or statically) allocated priority. The statuses change frequently (and outside the controlling program's control), whereas the priorities are only assumed to change infrequently and at known times by the controlling program.

The aim of the algorithm is to take the current statuses and quickly decide which of the active items has the highest priority.

The active status of all the items are available in a register where each single bit in that register corresponds to one of the items, and encodes the status of each item. B[n] gives the bit position for item n. The item is active if the value of its corresponding bit at position of B[n] is set to 1.

In this version of the algorithm several bit masks (of the same width as the status register) must be calculated every time the priorities change. The number of masks to be calculated is equal to the log to base 2 of the smallest power of two which is equal to, or bigger than, the number of bits in the status register. It shall be assumed for this description that the width of this register is 32 bits, and that the number of masks is therefore 5.

These five masks are calculated as follows, where each bit in each mask corresponds to the same item as the bits in the status register.

The first mask contains set bits for the 16 items with the highest priorities.

The second mask contains set bits for the 8 highest priorities plus the 8 highest priorities from the bottom 16 priorities. Etc, etc.

So if all the N items, n, each has a corresponding bit in the status register at position B[n].

And each item has a priority P[n], then we want to order all the items in a list from x=0 . . . N with the highest priority last. Let Ln[x] be the item at position x in the list.

Then we can define the masks as:

Mask [0]=B[Ln[x]], ORed together for all x where x&16==1

Mask [1]=B[Ln[x]], ORed together for all x where x&8==1

Mask [2]=B[Ln[x]], ORed together for all x where x&4==1

Mask [3]=B[Ln[x]], ORed together for all x where x&2==1

Mask [4]=B[Ln[x]], ORed together for all x where x&1==1

Therefore each 32-bit mask contains 16 set bits and 16 clear bits.

Assuming that the status register is read as S, then the following code will discover the highest priority set bit within S.

For each mask, m:
If (S & Mask[m]!=0)
S=S & Mask[m];

After this procedure the active bit with the highest priority is the only bit set in S.

If the bit position, Bp, is required, then either a logarithmic search for the one set bit can be performed, or the procedure can be added to as below, first the position, x, in the priority list of the highest priority active bit must be found: For each mask, m:

```
If (S & Mask[m] !=0){
    S = S & Mask[m];
    x + = 1 << (4-m);
}
```

Where x is initialised to zero beforehand. Then the item number n=Ln[x];

The advantage of this method is that there are only five masks (for a 32-bit register), which reduces the storage size, and allows some performance gain as five is a small enough number of mask such that they can all be loaded into registers at the same time. The disadvantage is that there is required to be the calculation of x and the lookup using Ln[n] to fine the number of the item.

The ARM code for this algorithm may be:

```
LDR r2, [r4, #IrqStatus]    ;// Get current IRQ status
LDMIA r1!, {r4, r5, r6, r7, r8, r9, r10, r11, r12};// Load all the masks etc
TST r2, r6           ;//Do we have one of the top 16 priority interrupts?
ANDNE r2, r2, r6
ADDEQ r1, r1, #16
TST r2, r7           ;//Out of the 16 interrupts we selected, do we have
ANDNE r2, r2, r7     ;// one in the top 8?
ADDEQ r1, r1, #8
TST r2, r8           ;// Of the 8 interrupts left, do we have one in the top 4?
ANDNE r2, r2, r8
ADDEQ r1, r1, #4
TST r2, r9
ANDNE r2, r2, r9
ADDEQ r1, r1, #2
TST r2, r10
ADDEQ r1, r1, #1
;// Now convert this into a real interrupt table entry index
LDRB r1, [r1]        ;//Do the indirection to get the real index.
ADD r11, r11, r1, LSL #4 ;//Now have address of table row in register
;// Get the data we need (source ID, parameter, ISR pointer and high priority mask)
LDMIA r11, {r0, r1, r2, r3}
```

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. Apparatus for processing data, said apparatus comprising:
   (i) an signal receiving circuit coupled to a plurality of signal sources, said signal receiving circuit providing a signal status word, one or more bits of said signal status word indicating whether a respective signal source has asserted a signal; and
   (ii) signal prioritising logic for reading said signal status word and identifying, using a branch search having a plurality of search levels, in accordance with a predetermined priority ordering, a highest priority signal source indicated by said signal status word as having asserted a signal; wherein
   (iii) said signal prioritising logic searches said signal status word using one or more programmable mask words that are combined with said signal status word to generate a result indicative of said highest priority signal source; and
   (iv) changing said one or more programmable mask words changes said predetermined priority ordering.

2. Apparatus as claimed in claim 1, wherein each level of said branch search serves to identify a reduced number of said plurality of signal source as candidates for being said highest priority signal source, a lowest level of said branch search serving to resolve a particular one of said plurality of signal sources as said highest priority signal source.

3. Apparatus as claimed in claim 2, wherein at one of said search levels, a programmable mask is selected from among a plurality of programmable masks for that search level in dependence upon search results from one or more preceding search levels.

4. Apparatus as claimed in claim 2, wherein which programmable mask used at each search level is independent of search results from one or more preceding search levels and said signal status word is modified at each search level in dependence upon search results from a preceding search level.

5. Apparatus as claimed in claim 4, wherein said signal status word is modified by setting one or more bits determined not to represent said highest priority signal source to a level indicative of a corresponding signal not being asserted.

6. Apparatus as claimed in claim 1, wherein said plurality of source signals are a plurality of interrupt signals.

7. Apparatus as claimed in claim 6, wherein said apparatus is an integrated circuit and a response time of said signal prioritising circuit forms at least a portion of an interrupt latency time for said integrated circuit.

8. Apparatus as claimed in claim 1, wherein said signal prioritising logic comprises a data processor operating under program instruction control.

9. Apparatus as claimed in claim 8, wherein said data processor includes data processing registers and said programmable mask words are stored in said data processing registers prior to searching for said highest priority signal source.

10. A method of processing data, said method comprising the steps of:
(i) generating a signal status word, one or more bits of said signal status word indicating whether a respective signal source has asserted a signal; and
(ii) reading said signal status word and identifying, using a branch search having a plurality of search levels, in accordance with a predetermined priority ordering, a highest priority signal source indicated by said signal status word as having asserted a signal; and
(iv) searching said signal status word using one or more programmable mask words that are combined with said signal status word to generate a result indicative of said highest priority signal source; wherein
(v) changing said one or more programmable mask words changes said predetermined priority ordering.

11. A computer program product having a computer program for controlling a data processing apparatus to perform a method as claimed in claim 9.

12. Apparatus for processing data, said apparatus comprising:
(i) a signal receiving circuit coupled to a plurality of signal sources, said signal receiving circuit providing a signal status word, one or more bits of said signal status word indicating whether a respective signal source has asserted a signal; and
(ii) signal prioritising logic for reading said signal status word and identifying, using a branch search having a plurality of search levels, in accordance with a predetermined priority ordering, a highest priority signal source indicated by said signal status word as having asserted a signal; wherein
(iii) said signal prioritising logic searches said signal status word using one or more programmable mask words that are combined with said signal status word to generate a result indicative of said highest priority signal source; and
(iv) changing said one or more programmable mask word changes said predetermined priority ordering, wherein each level of said branch search serves to identify a reduced number of said plurality of signal source as candidates for being said highest priority signal source, a lowest level of said branch search serving to resolve a particular one of said plurality of signal sources as said highest priority signal source, wherein which programmable mask used at each search level is independent of search results from one or more preceding search levels and said signal status word is modified at each search level in dependence upon search results from a preceding search level.

13. Apparatus as claimed in claim 12, wherein said signal status word is modified by setting one or more bits determined not to represent said highest priority signal source to a level indicative of a corresponding signal not being asserted.

14. A method of processing data, said method comprising the steps of:
(i) providing a signal status word from a signal receiving circuit coupled to a plurality of signal sources, and one or more bits of said signal status word indicating whether a respective signal source has asserted a signal; and
(ii) reading said signal status word and identifying, using a branch search having a plurality of search levels, in accordance with a predetermined priority ordering, a highest priority signal source indicated by said signal status word as having asserted a signal;
(iii) searching said signal status word using one or more programmable mask words that are combined with said signal status word and generating a result indicative of said highest priority signal source; and
(iv) changing said one or more programmable mask word changes said predetermined priority ordering, wherein each level of said branch search serves to identify a reduced number of said plurality of signal source as candidates for being said highest priority signal source, a lowest level of said branch search serving to resolve a particular one of said plurality of signal sources as said highest priority signal source; wherein which programmable mask used at each search level is independent of search results from one or more preceding search levels and said signal status word is modified at each search level in dependence upon search results from a preceding search level.

* * * * *